M. L. Babb
Furniture Caster.
Nº 48,146.      Patented June 13, 1865.
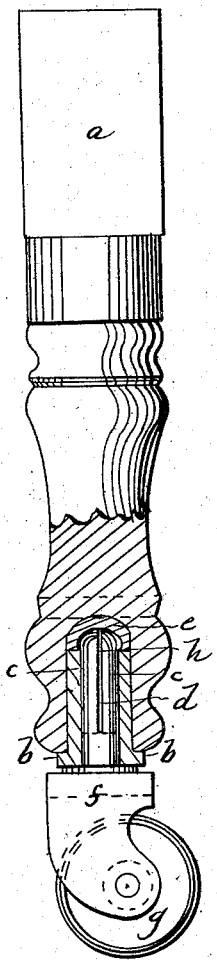 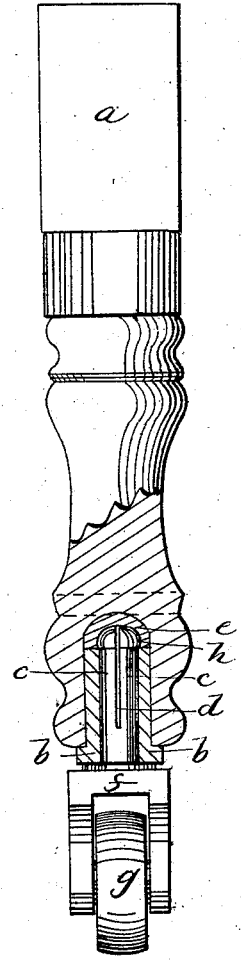
Witnesses:
Geo. E. B. Jackson
Mary Corbitt
Inventor:
Marshall L. Babb

UNITED STATES PATENT OFFICE.

MARSHALL L. BABB, OF CAPE ELIZABETH, MAINE.

IMPROVED CASTER FOR FURNITURE.

Specification forming part of Letters Patent No. 48,146, dated June 13, 1865.

*To all whom it may concern:*

Be it known that I, MARSHALL L. BABB, of Cape Elizabeth, in the county of Cumberland and State of Maine, have invented a new and useful Improvement in Casters for Furniture; and I do hereby declare that the following is a full and exact description thereof, reference being had to the annexed drawings, making a part of this specification.

The nature of my invention consists in so constructing the spindle of the caster and the cylinder in which it plays that the caster may be inserted or removed without trouble, and yet be so firmly fixed that it will not fall out. The caster may be constructed in any of the known forms.

My improvement consists in constructing the spindle $c\ c$ of any suitable metal, with an enlarged or bulbous head, $h$, and having one or more slits or slots, $d$, in the same longitudinally to a sufficient distance to give the required spring to the spindle. This spindle plays in the cylinder $b\ b$, which is made shorter than the spindle by the length of the bulbous head $h$. The spindle, when it has passed through the cylinder $b\ b$, expands, by force of the spring made by reason of the slits or slots $d$, into the open chamber $e$, and thus secures the caster in its place.

What I claim as my improvement is—

The slotted and bulbous-headed spindle $c\ c$, in combination with the cylinder $b$.

MARSHALL L. BABB.

Witnesses:
GEO. E. B. JACKSON,
THOMAS AMORY DEBLOIS.